United States Patent [19]

McMillan et al.

[11] Patent Number: 5,263,337
[45] Date of Patent: Nov. 23, 1993

[54] INERTIAL PARALLEL FLOW AIR CONDITIONER

[76] Inventors: Robert B. McMillan, 337 La Mirada, El Paso, Tex. 79932; Jess Marquez, 100 Libby, Canutillo, Tex. 78935

[21] Appl. No.: 826,916
[22] Filed: Apr. 21, 1992
[51] Int. Cl.⁵ .............................. F28D 5/00
[52] U.S. Cl. ........................ 62/304; 62/314
[58] Field of Search ............... 62/304, 310, 314

[56] References Cited

U.S. PATENT DOCUMENTS

| | | | |
|---|---|---|---|
| 1,060,269 | 4/1913 | Leinert | 62/310 |
| 1,478,471 | 12/1923 | Dowding | 62/304 |
| 1,980,533 | 11/1934 | Kile | 62/304 |
| 2,088,962 | 8/1937 | Kleucker | 62/314 |
| 2,304,804 | 12/1942 | Crouch | 62/310 |
| 2,730,874 | 1/1956 | Schelp | 62/314 |
| 3,922,151 | 11/1975 | Kiss et al. | 55/92 |
| 4,188,994 | 2/1980 | Hinshaw | 165/61 |
| 4,976,113 | 12/1990 | Gershumi et al. | 62/314 |

*Primary Examiner*—Albert J. Makay
*Assistant Examiner*—William C. Doerrler
*Attorney, Agent, or Firm*—Jacobson, Price, Holman & Stern

[57] ABSTRACT

An air cooling apparatus comprised of a cabinet, in which the upper portion contains an air inlet area and a water distribution header fitted with a plurality of water spray nozzles, and is also fitted with an insulated centrally slopping bottom pan which provides the cooling water reservoir and contains a debris collecting sump with a purge/drain valve, and a platform for mounting a submersible water circulation pump. Within the cabinet is mounted a vertical decreasing flow path air duct, which is fitted at its top with a basket containing a solid nonabsorbent aggregate cooling media over which is sprayed the re-circulated cooling water, and its bottom opened to an internal air chamber from which the cooled air is extracted. The bottom air duct opening is arranged to provide inertial separation of entrained liquid and solid particulate matter from the air stream.

1 Claim, 1 Drawing Sheet

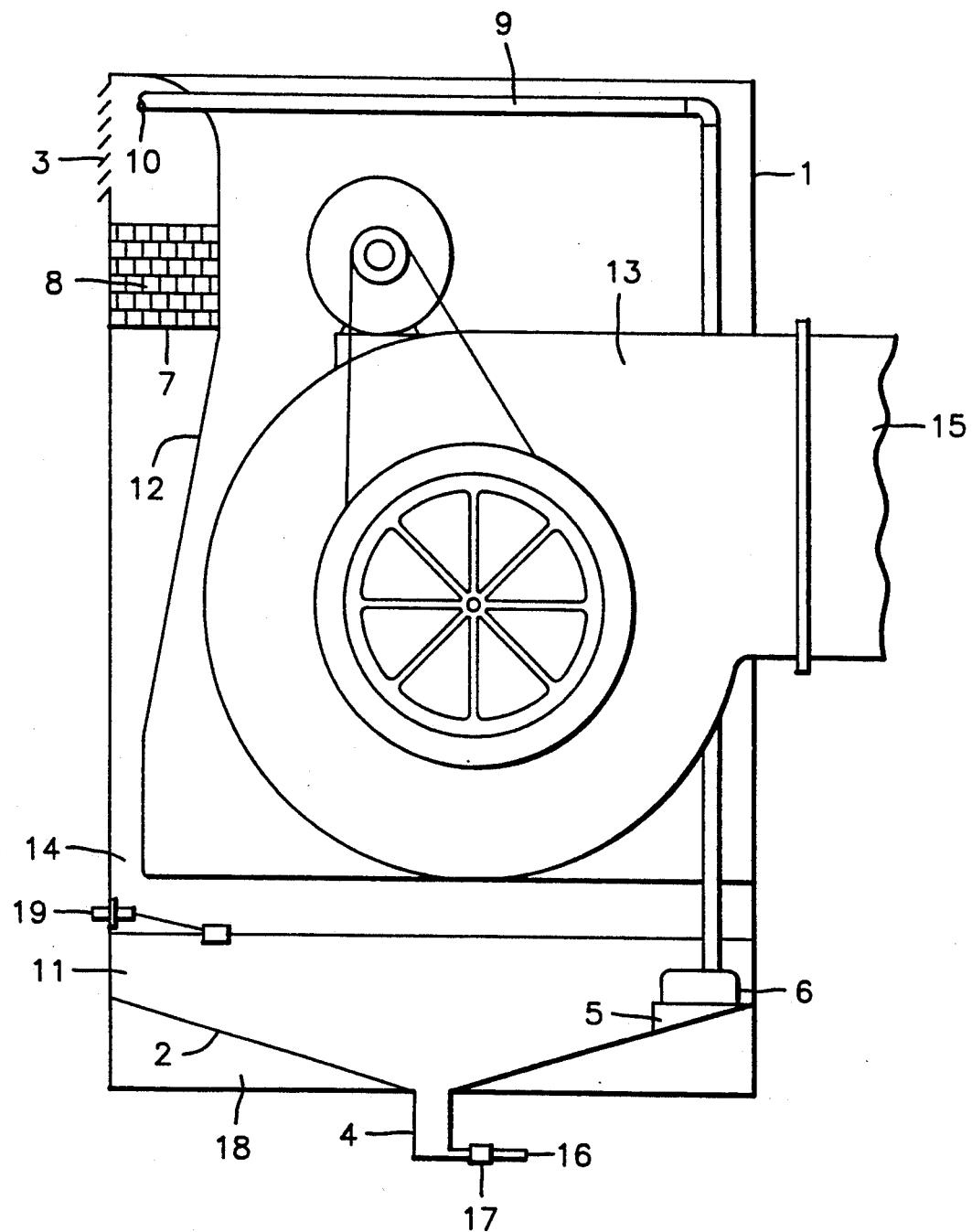

INERTIAL PARALLEL FLOW AIR CONDITIONER

FIELD OF THE INVENTION

The present invention relates to air cooling and particularly to evaporative air conditioning of enclosures intended for human occupation, in which the air is cooled by the latent heat of evaporation of water.

DISCLOSURE OF THE INVENTION

The principal object of the invention is to provide an apparatus for evaporative air conditioning in which the cooling efficiency is increased thru enhanced air water contact, and to provide cleaner outlet air thru particulate removal.

The invention is carried out by the inlet air stream contacting sprayed water from the cool water reservoir which is circulated by means of a submersible pump to a plurality of spray nozzles located above the inlet air duct. The air then contacts the wetted surface of the solid cooling media aggregate. The air is thus cooled by the latent heat of evaporation of the cooling water and by contact with the cooled solid media, which has a high specific heat. The air stream then enters the internal air flow duct which has a reducing flow area, increasing the air velocity. The air next encounters an abrupt turn, causing inertial separation of entrained solid and liquid particulate matter, and forcing it to contact the surface of the cool water reservoir further cooling the air stream and enhancing the removal of suspended matter. The air stream then enters either the inlet to a standard squirrel cage blower assembly or the inlet to an air duct that connects to a separately housed blower assembly.

Thus the invention can be used as a stand along air conditioner or as a self contained air cooling device that can be retrofited to existing evaporative air conditioners, or blower assemblies.

SUMMARY OF THE DRAWING

The objects and attendant advantages of this invention will be readily apparent from the following detailed description taken in conjunction with the accompanying drawing in which:

FIG. 1 is a side sectional view through the air conditioner.

PREFERRED EMBODIMENT OF THE INVENTION

In the exemplary embodiment of the invention a substantially cubic or cylindrical cabinet 1 is provided with a sloping bottom 2, and an opening near its top 3 for the air inlet. The bottom of the cabinet is also provided with as debris collector sump 4 in its center, and a shelf 5 for mounting a submersible water pump 6.

The cabinet is also provided with a cooling media retaining basket 7 that is fitted within the cabinet near its top. The cooling media retaining basket 7 is filled with solid aggregate cooling media 8, that has a high specific heat for maintaining the cooling media at a low temperature.

A water distribution header 9 is fitted with a plurality of spray nozzles 10, and is mounted to the cabinet 1 above the opening in the cabinet top 3, to provide a constant spray of water over the solid aggregate cooling media 8.

An internal air duct 12 is mounted within the cabinet 1, providing a decreasing flow path to increase the velocity. At the end of the air duct 12 the air stream makes an abrupt turn, causing inertial separation of entrained liquid and solid particulate matter.

When the invention is assembled as a stand alone air conditioner, a standard squirrel cage blower assembly 13, is mounted in the cabinet 1. In its optional configuration as an air cleaner/cooler, the squirrel cage blower assembly 13 or other air moving device would be externally mounted and connected by means of an external air duct 15. The external air duct 15 may either be attached to the outlet of a standard squirrel cage blower assembly 13 or may be directly attached to the cabinet 1 either from the rear, sides or the top.

A drain line 16 is provided to purge the debris collector sump 4 and is further fitted with either a manual valve 17 or optionally a solenoid operated valve 17 for the removal of accumulated solid particulate matter.

Under operation, water is pumped from the cool water reservoir 11 by the submersible water pump 6 to the water distribution header 9. The water is sprayed from a plurality of water nozzles or misters 10, onto the solid aggregate cooling media 8 wetting their surfaces. The water then flows down the internal air duct 12 and returns to the cool water reservoir 11.

Air enters the cabinet 1 through the opening near its top 3, where it comes into contact with the sprayed water from the water spray nozzles 10. The air then flows over the wetted solid aggregate cooling media 8 and is cooled as it passes around the cooling media 8 by the latent heat of evaporation of the water, and by contact with the cooled media 8.

The air flow path created by the internal air duct 12 and the cabinet 1, is employed to both improve cooling of the air stream and to remove suspended liquid and solid particulate matter. While the air is in the internal air duct 12, it is in constant contact with the falling water. The air enters the internal air duct 12 which has a gradually reducing flow area. This reduced flow area causes an increase in air velocity prior to the abrupt change in the flow direction at the end of the internal air duct 14. Any entrained liquid and/or solid particulate matter in the air stream is separated by interial forces. The air makes contact with the water reservoir 11 as it changes direction at the end of the internal air duct 14, further cooling the air stream. The insulated cabinet bottom 18, aids in maintaining the cool water reservoir 11, at a reduced temperature.

The air then enters the inlet of a standard squirrel cage blower assembly 13, or optionally enters directly into an external air duct 15, when an external air moving device is employed. The shape of the cabinet bottom 2, allows the separated solid particulate matter to flow by gravity and the constant agitation from the falling water, a debris collecting sump 4.

The drain line 16 is used to purge the debris collecting sump 4 by draining a portion of the water from the cool water reservoir 11. The drain valve 17 is briefly opened to provide the purging of the debris collecting sump 4. This is accomplished either manually, or optionally with an automatic solenoid drain valve 17. Make-up water to the cool water reservoir 11 is accomplished with a standard float valve assembly 19.

Having thus fully described our invention, what we claim as new and novel; and desire to secure by Letters Patent is:

1. An apparatus for cooling air by means of the latent heat of evaporation of water comprising a cabinet containing an air inlet adjacent an upper end thereof, a downwardly extending air/water flow path communicating with the air inlet, said cabinet including a bottom reservoir receiving a quantity of water with the reservoir communicating with a lower end of said air/water flow path, solid aggregate cooling media supported in said cabinet in said air/water flow path at an upper end portion thereof, means pumping water from the bottom water reservoir and spraying water onto said aggregate cooling media for evaporation of water and cooling the air/water by means of latent heat of evaporation of a portion of said water, said flow path defining a vertical-parallel downward air/water flow to increase air-water contact, said air/water flow path including a decreasing area at a lower end portion thereof to increase the air/water velocity, said cabinet defining an abrupt change in the direction of said air/water flow path at a lower end of said decreasing area thereby providing inertial separation of entrained liquid and solid particles, said reservoir being in communication with the lower end of said decreasing area to form a continuation of the flow path for cooling contact of the air stream with the cooled water in the reservoir, and means discharging cooled air from said cabinet with said discharging means being in communication with said reservoir.

* * * * *